United States Patent [19]

Brix et al.

US005763343A

[11] Patent Number: 5,763,343
[45] Date of Patent: *Jun. 9, 1998

[54] FIRE RETARDANT SAFETY GLASS

[75] Inventors: Peter Brix; Werner Kiefer, both of Mainz; Roland Leroux, Stad.-Elsheim, all of Germany

[73] Assignee: Schott Glaswerke, Germany

[*] Notice: The term of this patent shall not extend beyond the expiration date of Pat. No. 5,459,110.

[21] Appl. No.: 789,426

[22] Filed: Jan. 29, 1997

Related U.S. Application Data

[62] Division of Ser. No. 283,853, Aug. 1, 1994, Pat. No. 5,656,558.

[30] Foreign Application Priority Data

Jul. 30, 1993 [DE] Germany ............... 43 25 656.7

[51] Int. Cl.[6] .................. C03C 3/093; C03C 3/087
[52] U.S. Cl. ................... 501/67; 501/70; 65/114
[58] Field of Search ................ 501/67, 70; 65/114

[56] References Cited

U.S. PATENT DOCUMENTS

| | | | |
|---|---|---|---|
| 3,673,049 | 6/1972 | Giffen et al. | 161/164 |
| 3,779,733 | 12/1973 | Janakiramo-Rao | 501/70 |
| 3,984,252 | 10/1976 | Kiefer | 501/67 |
| 4,298,388 | 11/1981 | Sack | 501/15 |
| 4,396,682 | 8/1983 | Mohri et al. | 501/67 |
| 4,640,900 | 2/1987 | Kokubu et al. | 501/67 |
| 5,344,798 | 9/1994 | Morimoto et al. | 501/70 |
| 5,362,689 | 11/1994 | Morimoto et al. | 501/70 |
| 5,380,685 | 1/1995 | Morimoto et al. | 501/70 |
| 5,459,110 | 10/1995 | Brix | 501/67 |

FOREIGN PATENT DOCUMENTS

| | | |
|---|---|---|
| 25 19 176 | 11/1976 | Germany. |
| 29 41 215 | 1/1981 | Germany. |
| 42 30 607 | 1/1994 | Germany. |
| 2 067 549 | 7/1981 | United Kingdom. |

OTHER PUBLICATIONS

Chemical Abstr., vol. 77, No. 20 (129954h), Nov. 13, 1972.
Chemical Abstr., vol. 103, No. 2 (10373h), Jul. 15, 1985.
Chemical Abstr., vol. 106, No. 20 (161428t), May 18, 1987.
Chemical Abstr., vol. 106, No. 24 (200648m), Jun. 15, 1987.

*Primary Examiner*—Karl Group
*Attorney, Agent, or Firm*—Millen, White, Zelano & Branigan, P.C.

[57] ABSTRACT

Hard glass fire retardant glasses can be tempered in a conventional air tempering plant having heat transmission values of approximately 200–500 W/(m$^2$×K) yielding in the tempered state a fire resistance period of at least 30 minutes according to DIN 4102 and the safety properties according to DIN 1249 (safe break). In order to achieve the combination of fire resistance period and safety properties, the glasses must have a coefficient of thermal expansion $\alpha_{20/300}$ of between 3 and 6×10$^{-6}$ K$^{-1}$, a specific thermal stress $\phi$ of between 0.3 and 0.5 N/(mm$^2$×K), a glass transition temperature Tg of between 535° and 850° C., a product of specific thermal stress $\phi$ multiplied by (Tg −20° C.) of between 180 and 360 N/mm$^2$, an upper annealing temperature (temperature at a viscosity of 10$^{13}$ dpas) of over 560° C., a softening temperature (temperature at a viscosity of 10$^{7.6}$ dpas) of over 830° C. and a working temperature (temperature at a viscosity of 10$^4$ dpas) of below 1300° C.

14 Claims, No Drawings

FIRE RETARDANT SAFETY GLASS

This application is a divisional of U.S. application Ser. No. 08/283,853, filed Aug. 1, 1994, now U.S. Pat. No. 5,656,558.

BACKGROUND OF THE INVENTION

The invention relates to a glass body, especially in the tempered state, in of a glass panel or glass pane, which is suitable for the production of highly heat-stable glazings which meet both fire retardant and safety glass requirements. Although the invention is described in terms of German requirements, the invention is also intended to conform to U.S. standards and requirements, e.g., those of the Underwriters Laboratories.

Fire retardant glazings including frames and hardware must conform to fire resistance classes in terms of retarding the passage of fire and smoke. In Germany, fire retardant glazings are classified into fire resistance classes G30, G60, G90 and G120. Installation in the frame results in the glass panel or panel being covered at its edge by the lip of the frame which retains the glass. In the event of an outbreak of fire, there arises between the covered edge of the pane and the exposed center of the pane a temperature difference which, depending on the depth and type of edge covering, can be between 200 and 350 K. The fire resistance period in a standard fire to DIN 4102 depends in the first instance on the softening temperature (EW), pane size, pane thickness and the edge cover, and on absorption, reflection and thermal conductivity of the glass.

The wider the edge cover, the longer the glazing withstands being pulled out of the frame. The softening temperature of a glass is given in accordance with DIN 52312, Part 3, as the temperature at which the glass has a viscosity of $10^{7.6}$ dpas, approximately the same viscosity at which glassblowers form glassware.

In the case of glazings in buildings, the glazings must frequently meet a number of requirements simultaneously. Fire retardant glazings which are installed, for example, in doors, must ensure the safety of users in daily use, in addition to affording fire protection. Thus, glazings may not break easily under mechanical loading. If, for example, in spite of this breakage resistance, an impact by a human body against the glazing results in pane breakage, there should be forced only small, blunt-edged fragments as the glazing breaks (DIN 18361, Section 2.3.6.3).

In practice three types of monolithic glasses are currently used for fire retardant glazings. The most frequently used is wired lime-soda glass. In the event of an outbreak of fire, the wired glass cracks after only a few minutes. The pieces of glass are, however, held together by the embedded spot-welded wire mesh. Wired glasses are able to resist fire for up to 60 minutes in specific designs having relatively small pane dimensions. Under mechanical loading, however, wired glasses break more easily than normal glass panes of the same thickness because the glass exhibits fine internal flaws which are due to the wire mesh. Mechanical breakage may cause serious injury as a result of barb formation. A further disadvantage of wired glasses is their less attractive appearance.

Thermally highly-tempered lime-soda glasses (for example float glass) are also utilized as fire retardant glazings. The high coefficient of thermal expansion of these glasses means that such glass panes possess, even at a high compressive stress of 120N/mm²—irrespective of pane thickness—a temperature difference resistance (TUF), between the cold edge of the pane and the hot center of only about 200 to 220 K. The temperature difference resistance characterizes the property of a pane to withstand the difference in temperature between the hot center of the pane and the cold edge. The parameter for the TUF is given as the temperature difference in degrees Kelvin between the maximum temperature of the hot pane surface in the central zone of the pane and the temperature of the (covered) cold edge of the pane, exceeding which as a rule results in stress fracture. The temperature difference resistance (TUF) is determined by the following standard method of measurement: panes (approx. 25×25 cm²) are heated in defined manner in the central zone of the panel (area approx. 254 cm²), with a 2 cm wide edge of the pane being held at room temperature. The ratio of the cold surface area to the hot surface area which is thus adjusted is selected such that the maximum permitted temperature difference determined by the standard measuring method is directly translatable to the majority of installation situations in conventional practice. The TUF is given as that temperature difference between the hot center of the pane and the cold edge, at which 5 or less percent of samples fail as a result of fracture.

So that in the event of fire the TUF, which in the case of lime-soda glasses is very low, for a fire protection glazing not to be exceeded, only a narrow retaining lip equivalent to a small rebated glass depth of 10 mm or less, is permitted, leading to more rapid heating of the edge of the pane. At approximately 780° C., the softening temperature of lime-soda glass (float glass) is also relatively low, so that fire retardant glazings of thermally tempered lime-soda glass are able to resist fire for 30 minutes only in specific frame systems and at certain pane sizes and thicknesses, thus conforming only to the lowest fire resistance class, G30. The safety glass requirements (safe break) are, however, met by these glasses.

The third commonly used fire protection glass is a thermally tempered borosilicate glass having a low coefficient of thermal expansion $\alpha_{20/300}$ of $3.3 \times 10^{-6}$ $K^{-1}$. The maximum compressive stress which can be achieved in this glass is about 50–60N/mm² using a conventional air tempering plant which can achieve a heat transmission coefficient of approx. 300 Watt per (m²×K). Despite this low compressive stress, the glasses nevertheless possess a temperature difference resistance in excess of 400 K as a result of the low specific thermal stress $\phi$ of 0.25. The specific thermal stress $\phi$ is calculated using the equation $\phi = \alpha \times E/(131 \mu)$, where E denotes the elastic modulus N/mm² and $\mu$ the Poisson constant. These fire retardant glazings resist the heating-up process at the beginning of a fire even with a 20 to 30 mm edge cover. The higher softening temperature of 820° C. enables these fire protection glazings, depending on design, to resist fire for 90–120 minutes. Although the low temper of 50–60N/mm² is adequate to compensate for thermal stresses during the heating-up phase of a fire, however, it is insufficient to allow the glazing to disintegrate into fine fragments required by DIN 1249, Part 12, in the event of mechanical breakage. Consequently, these glazings cannot be used for all applications.

It is also known that chilling glasses by immersion in oil-coated water can achieve a heat transmission which is higher by a factor of about 10 than that achieved by air chilling. This makes it fundamentally possible to generate a compressive stress of approx. 100N/mm² in a 5 mm-thick pane of borosilicate glass having a thermal expansion of only $3.3 - 10^{-6}$ $K^{-1}$. The temperature difference resistance is in this way increased to some 600 K, and the glazing disintegrates into fine fragments in the event of mechanical breakage.

Although this increased temperature difference resistance would allow a wider edge cover, an edge cover wider than 30 mm does not afford appreciable advantages in terms of the fire resistance period and is therefore not used in practice. Tempering glasses by chilling in oil-coated water has considerable disadvantages in comparison with air chilling, and these have hitherto largely prevented its use in producing fire safety glasses. On the one hand, the process is technically more demanding and considerably more cost-intensive than air chilling in a conventional air tempering plant, and on the other, chilling in oil-coated water requires the panes to be heated up and chilled vertically, suspended on nippers. The impressions left by the nippers are, however, always a particular weak point from an aesthetic viewpoint in the case of glazings.

SUMMARY OF THE INVENTION

An object of the invention is to provide glass panes which can be tempered sufficiently in a conventional air tempering plant having a heat transmission coefficient of approx. 200 to 550 Watt per (m²×K) at 1 to 19 kPas blowing pressure so as to yield glazings that disintegrate into fine fragments according to DIN 1249 in the event of mechanical breakage while, as fire retardant glazings, reliably resist fire for 30–120 minutes, even in large sizes, depending on design, in conventional frame systems and without the need for wire.

Another object is to provide the resultant tempered glass and glazings.

Upon further study of the specification and appended claims, further objects and advantages of this invention will become apparent to those skilled in the art.

These objects are achieved by providing a tempered glass body having in the tempered state the following properties:

a coefficient of thermal expansion $\alpha_{20/300}$ between 3 and $6\times10^{-6}$ $K^{-1}$, a specific thermal stress $\phi$ between 0.3 and 0.5 n/(mm²× K), a glass transition temperature Tg between 535 and 850° C., a product of the specific thermal stress $\phi$ multiplied by (Tg-20° C.) between 180 and 360N/mm², a temperature at a viscosity of $10^{13}$ dPas above 560° C., a softening temperature at a viscosity of $10^{7.6}$ dPas above 830° C., a working temperature at a viscosity of $10^4$ dPas (working temperature) below 1300° C., said glass consisting essentially of composition A or composition B in weight percent based on oxides:

Composition A

| | |
|---|---|
| SiO₂ | 73–78 |
| B₂O₃ | 9–12 |
| Al₂O₃ | 1.5–4 |
| Li₂O | 0–4 |
| Na₂O | 1–5 |
| K₂O | 1–5 |
| MgO | 0–3 |
| CaO | 1–3 |
| SrO + BaO | 0–2 |
| ZnO | 1–2 |
| ZrO₂ | 0.5–3 |
| Σ alkali metal oxides | 5–7 |
| Σ MgO + CaO + SrO + BaO + ZnO + ZrO₂ | 6–10 |

Composition B

| | |
|---|---|
| SiO₂ | 57–64 |
| B₂O₃ | 0–6 |
| Al₂O₃ | 12–17 |
| MgO | 0–6 |
| CaO | 5–19 |
| SrO + BaO | 0–6.5 |
| ZnO | 0–7 |
| ZrO₂ | 1–5.5 |
| CeO₂ | 0–8 |
| TiO₂ | 0–4.5 |
| Σ MgO + CaO + SrO + BaO + ZnO + ZrO₂ + CeO₂ + TiO₂ | 6–10. |

Compositions A and B may optionally include NaCL, Sb₂O₃, As₂O₃, and CeO2 in conventional quantities as refining agents.

The coefficient of thermal expansion $\alpha_{20/300}$ of the glasses should be between 3 and $6\times10^{-6}$ $K^{-1}$. Glasses having such low coefficients of thermal expansion are also known as hard glass. The specific thermal stress $\phi$ should be between 0.3 and 0.5N/(mm2 K). The specific thermal stress $\phi$ is calculated using the equation $\phi = E\times\alpha/(1-\mu)$, where $\alpha$ is the coefficient of thermal expansion, E is the elastic modulus and $\mu$ is the Poisson number. The elastic modulus E, at 65 GPa, and the Poisson number $\mu$, at 0.2, are taken as constant, because they change hardly at all with glass composition. Fire retardant glazings should exhibit a temperature difference resistance of at least 330, preferably 350, in particular at least 400 K, in order, in the event of outbreak of a fire, to withstand reliably the more rapid heating of the center of the pane (when the edge of the pane is cold), with an edge covering of adequate width. Panes which are between 5 and 7 mm thick are generally utilized as fire retardant glazings, with 5 mm-thick panes generally preferred for reasons of cost. In order for thermally tempered panes to disintegrate into fine fragments in the event of mechanical breakage and in order to comply with the safety properties to DIN 1249 (safe break), they must as a rule exhibit a compressive stress of at least 80N/mm². However, if the compressive stress is too great, that is to say markedly above 120N/mm², there is a danger that internal defects in the glass (for example crystals or microscopic particles) may lead to direct or delayed spontaneous breakage of the pane.

The temperature difference resistance of a pane is dependent on the quotient of total pane strength divided by specific thermal stress $\phi$. The theoretical total pane strength is in turn made up of the basic strength of the glass ($\sigma_G$) and the compressive stress ($\sigma_v$). In the light of the requirement for a maximum compressive stress of 120N/mm² and a minimum temperature difference resistance of 350 K, the resulting upper limit for the specific thermal stress is approx. 0.5N per (mm²×K) is obtained. For a minimum compressive stress of approx. 80N/mm2 and a temperature difference resistance of 400 K, a thermal stress factor of 0.3N per (mm²×K) is allowed.

It is known that in a given tempering plant (constant heat transmission), the higher the thermal expansion $\alpha$ and/or the thermal stress factor ⓔ the greater the compressive stress $\sigma_v$, generated in the glass pane. However, whereas the specific thermal stress $\phi$ should be as low as possible for a high temperature difference resistance, it has to be as high as possible in order to generate sufficient compressive stress. It is therefore described (DE 30 01 944) that in the case of hard glasses ($\alpha \leq 6\times10^{-6}$ K) having a specific thermal stress <0.5N per (mm²×K) it is not possible by means of air chilling to generate a temper which is sufficient for use as safety glass.

It has surprisingly been found that, even in a conventional air tempering plant, such glasses can be tempered so highly that they have a temperature difference resistance of at least 350 K and simultaneously the property of a safety glass if their product of coefficient of thermal stress φ multiplied by (Tg–20° C.) is between 180 and 360N/mm² and their glass-transition temperature Tg is between 535 and 850° C.

It has emerged that increasing the transition temperature of the glass increases both the compressive stress and, as a result of this compressive stress, the temperature difference resistance.

Although there is in principle no upper limit to the transition temperature Tg, a Tg of 850° C., preferably 750° C., should not be exceeded as otherwise there is a danger that in the event of fire the glazing will be broken by the steel frame as it becomes distorted, because the glass is not yet soft enough. Moreover, as the Tg rises, the capital and operating costs for the heating furnace naturally also increase, because the pane must be heated to above the Tg before chilling. If the transition temperature Tg falls below 535° C., it is generally no longer possible to achieve the desired temper.

Furthermore, in order to achieve the twin goals of fire resistance period and temper (safe break) in the glass, panes, the product of specific thermal stress φ multiplied by (Tg–20° C.) must be between 180 and 360 N/mm². If this range is exceeded, the temperature difference resistance falls. Below the value of 180N/mm², these glasses can no longer conform to safety glasses when using conventional air tempering plants.

It should be possible to effect the tempering in a conventional air tempering plant, that is to say air tempering plants which enable lime-soda glasses of up to a minimum thickness of 2.8 mm to be tempered in a conventional manner. The tempering takes place in these plants by the blowing-on of air at a blowing pressure of 1–10 kPas. This achieves a heat transmission of approx. 200–550 W/(m²×K). Conventional present-day plants operate within the heat transmission region of approx. 300 W/(m²×K). When heat transmission is below 200 W/(m²×K) it is generally no longer possible to achieve adequate temper. It is perfectly possible to use a tempering plant having heat transmission values higher than 550 W/(m²×K); however, an increase in the heat transmission values in air tempering plants is associated with increasing technical demands. In the case of glazings in buildings, horizontal tempering plants are preferred, since these are able to avoid leaving objectionable nipper impressions in the tempered glass. For additional information on conventional air tempering plants and the subject of tempering in general, reference is made to the patent and general literature on the subject, e.g., Uhlmann and Kneidl, *Glass, Science and Technology*, Vol. 5, Chapter 5, "Thermal Tempering of Glass," especially pp. 199–203, Robert Gordon, 1980, Academic Press, New York.

Fire tests have shown that the softening temperature of the glasses should be above 830° C., in particular above 860° C. An elevated softening temperature has the advantage that either larger glazings can be obtained in the same fire resistance class, or that glazings of the same size attain the next highest fire resistance class. Under certain circumstances it is also possible at higher softening temperatures to utilise thinner panes, eg 5 mm thick, instead of 7 mm thick panes. The term softening temperature is understood to be the temperature at which the glass has a viscosity of $10^{7.6}$ dPas.

Since the quality requirements of the fire protection glazings are stringent as regards absence of bubbles and reams, the working temperature VA, that is to say the temperature at which the viscosity of the glass is $10^4$ dPas (working temperature), should not exceed 1300° C., and preferably not exceed 1280° C. Glasses having such working temperatures can still be produced on float glass plants.

Finally, the temperature of the upper annealing temperature, that is to say the temperature at which the viscosity of the glass is $10^{13}$, should also be above 560° C., in order to avoid leaving on the glass impressions of the conveyor rollers used in the tempering plant. A range of from 600° to 620° C. is preferred for the upper annealing temperature.

The following equations show the link between heat transmission value α-, temper $σ_v$, basic strength of the glass $σ_G$, temperature difference resistance TUF, pane thickness d and glass transition temperature Tg.

$$\phi = \frac{\sigma_V + \sigma_G}{TUF}$$

$$B = \frac{\alpha' \times d/2}{\lambda + \alpha' \times d/2} \quad \begin{array}{l} \alpha' = \text{heat transmission number} \\ \lambda = \text{thermal conductivity} \end{array}$$

$$\sigma_v/B = \phi \times (Tg - T\infty)$$

It is possible to make some simplifications to the calculations: a basic strength $σ_G$ of 50N/mm² and a thermal conductivity of 1.45 W/(m×K) may be taken as constant in respect of all glasses, because these values do not to any real extent depend on the composition of the glass. Room temperature (20° C.) can be inserted for T∞. Table 1 shows some examples of the glass transition temperature at different temper values $σ_v$, temperature difference resistance TUF, and pane thickness d.

TABLE 1

| No. | $\alpha_v$ | TUF | ψ | d | B | $\sigma_v/B$ | $\sigma_v/(B \cdot v)$ | Tg |
|---|---|---|---|---|---|---|---|---|
| 1 | 80 | 350 | 0.37 | 7 | 0.42 | 191 | 515 | 535 |
| 2 | 80 | 350 | 0.37 | 5 | 0.34 | 235 | 635 | 655 |
| 3 | 120 | 350 | 0.49 | 7 | 0.42 | 285 | 581 | 601 |
| 4 | 120 | 350 | 0.49 | 5 | 0.34 | 353 | 720 | 740 |
| 5 | 80 | 400 | 0.325 | 7 | 0.42 | 191 | 588 | 608 |
| 6 | 80 | 400 | 0.325 | 5 | 0.34 | 235 | 723 | 743 |
| 7 | 120 | 400 | 0.425 | 7 | 0.42 | 285 | 670 | 690 |
| 8 | 120 | 400 | 0.425 | 5 | 0.34 | 353 | 830 | 850 |

Borosilicate glasses having glass transition temperatures of up to 600° C. are suitable for tempers $σ_v$ of up to 120N/mm² at pane thicknesses of approx. 7 mm, see Table 1, No. 3.

Borosilicate glasses having the required properties may be found within the following composition range (as wt-%, based on oxide): $SiO_2$ 73–78; $B_2O_3$ 9–12; $Al_2O_3$ 1.5–4; $Na_2O$ 1–5; $K_2O$ 1–5; $Li_2O$ 0–4; Σ $Na_2O+K_2O+Li_2O$ 5–7; MgO 0–3; CaO 1–3; BaO+SrO 0–2; ZnO 1–2; $ZrO_2$ 0.5–3; Σ MgO+CaO+SrO+BaO+ZnO+$ZrO_2$ 6–10 and optionally also refining agents such as $Sb_2O_3$, $As_2O_3$, $CeO_2$ or NaCl in the conventional quantities. Both the softening temperatures of up to 860° C. and the working temperatures of below 1300° C. of these glasses lie within the required range.

For even higher tempers or thinner panes, only alumosilicate glasses having a glass transition temperature Tg>650° C. may be utilised. Alumosilicate glasses having the required properties are within the composition range (as wt-%, based on oxide) of: $SiO_2$ 57–64; $B_2O_3$ 0–6; $Al_2O_3$ 12–17; MgO 0–6; CaO 5–19; SrO+BaO 0'Σ MgO+CaO+ SrO+BaO+ZnO+$ZrO_2$+$CeO_2$ +$TiO_2$ 16–26; and optionally also conventional refining agents such as NaCl, $Sb_2O_3$, $AS2O_3$ in the conventional quantities.

With increasing fire duration and hence increasing pane temperature, the total transmission of the glass increases. The result is to increase the thermal radiation on the side of the pane which is remote from the fire as the fire duration increases. This limits the scope for using these glasses, in particular if there are readily ignitable materials by the fire protection glazing on the side remote from the fire, or if escape routes for people or animals must be safeguarded.

In order to reduce this thermal radiation, multilayer glazings are used in which heat-consuming or intumescent interlayers are applied, and when the heat is intense, these foam or bring about a drop in the pane temperature on the side remote from the fire by evaporating or becoming turbid. It is furthermore known to coat panes on the side facing the fire or on both sides in temperature-resistant, heat-reflecting manner, thus bringing about a reduction in the thermal radiation emitted by the pane.

Although all of these layers effect a high degree of reflection of thermal radiation, which may be over 75%, and show only a low degree of emission (below 25%) in the event of fire, these layers do increase the cost of the product considerably and cannot, moreover, for optical reasons be utilized without restriction in glazings in buildings.

Surprisingly, in the case of the borosilicate glasses there takes place during the gradual rise in temperature which occurs in the panes in the event of fire, in particular at high temperatures, a partial demixing which gives rise to a second vitreous phase having a high boric acid content. This partial demixing takes place on the fire side of the glass, where it causes turbidity of the glass, thus significantly reducing passage of thermal radiation. The result is a reduction in surface temperature and in thermal radiation of the glazing. Moreover, the glass—irrespective of composition—can become more rigid as a result of this demixing. Similar effects are observed when alumosilicate glasses are used in lieu of the borosilicate glasses. However, in the case of alumosilicate glasses there is no demixing, surface crystallisation instead taking place which, however, has the same effects in terms of reducing the passage of radiation and stiffening the pane at higher temperatures.

Although the description of the invention focuses substantially on the example of a fire protection safety glass, the glass according to the invention is also particularly suitable for producing tempered glass bodies which must both meet safety glass requirements and also have a high thermal resistance: for example, for light domes, portholes, glass cupola roofs, glass doors, furnace doors (including curved), smoke control doors, protective glasses for lights, baking oven windows, etc.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever.

In the foregoing and in the following examples, all temperatures are set forth uncorrected in degrees Celsius; and, unless otherwise indicated, all parts and percentages are by weight.

The entire disclosures of all applications, patents, and publications cited above and below and of corresponding German P 43 25 656.2, filed Jul. 30, 1993, are hereby incorporated by reference.

EXAMPLES

Where compressive stresses are indicated in the following Examples, these were quantified both non-destructively, by measuring stress-optical birefringence (as $N/mm^2$) and also following destruction of the pane, by counting the glass fragments (n=average number per 50 mm×50 mm counting field) and the average fragment area a (in $mm^2$). If the appearance of the fragments complies with the requirements of DIN 1249 for safety glass, this is indicated by the word "complies". The mechanical stability of the tempered panes to an impact delivered in pendulum manner was furthermore determined and classified, for example to BS 6206 or DIN 52337. The resistance periods in the fire test were determined to DIN 4102 using the unit temperature curve (ETK).

Example 1

A 1200 mm×2000 mm borosilicate flat glass pane 5 mm thick was installed with a 15 mm rebated edge in a steel frame and was subjected to the fire test to DIN 4102. The composition of the glass (as wt-%, based on oxide) was: 74.0 $SiO_2$; 10.1 $B_2O_3$; 2.8 $Al_2O_3$; 3.5 $Na_2O$; 3.6 $K_2O$; 2.7 CaO; 1.4 ZnO; 1.7 $ZrO_2$ and 0.2 $TiO_2$.

This glass has the following properties: $\alpha_{20/300}$=4.5×10$^{-6}$ K$^{-1}$; Tg=585° C.; upper annealing temperature=601° C.; softening temperature=860° C.; working temperature=1250° C.; $\phi$=0.45N/(mm$^2$×K); $\phi$×(Tg - 20° C.)=254N/mm$^2$; average temper=98N/mm$^2$ (n>150, a<18); mode of fragmentation to DIN 1249=complies; pendulum impact to BS 6206= class A.

Resistance period: (DIN 4102, Part 13) in the fire test was >60 minutes.

Example 2

A borosilicate flat glass pane 6 mm thick as the backing pane of a fire protection insulating glazing of the following structure: float glass (4 mm thick)/inter-pane gap (12 mm)/ borosilicate safety glass (6 mm thick) in a 1400 mm×2400 mm pane format was installed with a 20 mm rebated edge in a steel frame and was subjected to a fire test. The principal constituents of the glass were as follows (as wt-%, based on oxide):

| | |
|---|---|
| 73.70% | $SiO_2$ |
| 11.10% | $B_2O_3$ |
| 2.90% | $Al_2O_3$ |
| 2.20% | $Na_2O$ |
| 3.80% | $K_2O$ |
| 2.70% | CaO |
| 1.60% | ZnO |
| 2.00% | $ZrO_2$ |
| 0.10% | $TiO_2$ |

The physical properties of the borosilicate flat glass pane were as follows:

| | |
|---|---|
| $\alpha_{20/300}$ | 4.2 × 10$^{-6}$ K$^{-1}$ |
| Tg | 590° C. |
| upper annealing temperature | 610° C. |
| softening temperature | 865° C. |
| working temperature | 1260° C. |
| $\psi$ | 0.40 N/(mm$^2$ × K) |

|   |   |
|---|---|
| ψ × (Tg −20° C.) | 288 N/mm² |
| average temper | 92 N/mm² (n > 130, a < 15) |
| mode of fragmentation to DIN 1249: | complies |
| pendulum impact to BS 6206 | class A |

The resistance period of this glazing in the fire test to DIN 4102, Part 13 was over 90 minutes.

Example 3

6 panes of a 6 cm-thick alumosilicate flat glass of format 50×50 cm² were installed with a 20 mm rebated edge in a 6-field steel frame.

The average composition of the glass (as wt-%, based on oxide) was as follows:

|   |   |
|---|---|
| 59.50% | $SiO_2$ |
| 5.50% | $B_2O_3$ |
| 15.00% | $Al_2O_3$ |
| 0.50% | $Li_2O$ |
| 0.70% | $Na_2O$ |
| 4.50% | MgO |
| 6.00% | CaO |
| 0.50% | BaO |
| 6.20% | ZnO |
| 1.20% | $ZrO_2$ |
| 0.10% | $Sb_2O_3$ |

The physical properties were as follows:

|   |   |
|---|---|
| $\alpha_{20/300}$ | $4.1 \times 10^{-6}$ K⁻¹ |
| Tg | 655° C. |
| upper annealing temperature | 653° C. |
| softening temperature | 868° C. |
| working temperature | 1190° C. |
| ψ | 0.46 N/(mm² × K) |
| ψ × (Tg −20° C.) | 292 N/mm² |
| average temper | 92 N/mm² (n > 120, a < 20) |
| mode of fragmentation to DIN 1249: | complies |
| pendulum impact to BS 6206 | not tested |

This pane was able to resist fire for a period of over 120 minutes in the fire test to DIN 4102, Part 13.

Examples 4–18

Tables 2 and 3 set out the composition and physical properties further borosilicate glasses.

TABLE 2

| No. | $SiO_2$ | $B_2O_3$ | $Al_2O_3$ | $Na_2O$ | $K_2O$ | MgO | CaO | BaO | ZnO | $ZrO_2$ |
|---|---|---|---|---|---|---|---|---|---|---|
| 4 | 73.50 | 9.00 | 1.50 | 5.00 | 1.00 | 3.00 | 1.00 | 1.00 | 2.00 | 3.00 |
| 5 | 74.70 | 11.00 | 2.00 | 2.40 | 3.00 |  | 2.40 |  | 2.00 | 2.50 |
| 6 | 77.60 | 9.00 | 1.50 | 2.50 | 2.95 |  | 2.35 |  | 1.60 | 2.50 |
| 7 | 75.45 | 10.00 | 2.50 | 2.00 | 3.60 |  | 2.35 |  | 1.60 | 2.50 |
| 8 | 75.90 | 10.00 | 2.00 | 2.20 | 3.45 |  | 2.35 |  | 1.60 | 2.50 |
| 9 | 75.05 | 10.00 | 2.50 | 2.00 | 4.00 |  | 2.35 |  | 1.60 | 2.50 |
| 10 | 74.80 | 10.00 | 2.50 | 2.00 | 4.25 |  | 2.35 |  | 1.60 | 2.50 |
| 11 | 74.25 | 11.00 | 2.50 | 2.30 | 3.50 |  | 2.35 |  | 1.60 | 2.50 |
| 12 | 73.65 | 10.00 | 3.50 | 3.05 | 2.70 |  | 3.00 |  | 1.60 | 2.50 |
| 13 | 74.50 | 10.00 | 2.50 | 2.00 | 4.55 |  | 2.35 |  | 1.60 | 2.50 |
| 14 | 73.50 | 11.05 | 2.90 | 2.00 | 4.25 |  | 2.70 |  | 1.60 | 2.00 |
| 15 | 73.60 | 11.05 | 2.90 | 2.00 | 4.15 |  | 2.70 |  | 1.60 | 2.00 |
| 16 | 73.60 | 11.10 | 2.90 | 2.20 | 3.90 |  | 2.70 |  | 1.60 | 2.00 |
| 17 | 73.70 | 11.10 | 2.90 | 2.20 | 3.80 |  | 2.70 |  | 1.60 | 2.00 |
| 18 | 74.20 | 11.10 | 2.90 | 1.70 | 3.80 |  | 2.70 |  | 1.60 | 2.00 |

TABLE 3

| No. | $\alpha_{20/300}$ ×10⁻⁶K⁻¹ | Tg °C. | Temperature at 10¹³ dPas [°C.] | Temperature at 10¹·⁶ dPas [°C.] | Temperature at 10⁴ Pas [°C.] | φ [N/(mm² × K)] | φ ×(Tg −20° C.) [N/mm²] |
|---|---|---|---|---|---|---|---|
| 4 | 4.50 | 579 | 579 | 831 | 1210 | 0.37 | 204 |
| 5 | 4.03 | 575 | 605 | 847 | 1240 | 0.33 | 182 |
| 6 | 3.95 | 589 | 617 | 859 | 1271 | 0.32 | 183 |
| 7 | 3.98 | 589 | 610 | 865 | 1283 | 0.33 | 184 |
| 8 | 4.07 | 585 | 611 | 848 | 1257 | 0.33 | 187 |
| 9 | 4.19 | 589 | 609 | 870 | 1260 | 0.34 | 194 |
| 10 | 4.23 | 589 | 610 | 864 | 1255 | 0.34 | 196 |
| 11 | 4.14 | 580 | 603 | 870 | 1241 | 0.34 | 188 |
| 12 | 4.40 | 597 | 609 | 848 | 1254 | 0.36 | 206 |
| 13 | 4.35 | 591 | 606 | 847 | 1252 | 0.35 | 202 |
| 14 | 4.32 | 587 | 601 | 837 | 1234 | 0.35 | 195 |
| 15 | 4.36 | 585 | 603 | 842 | 1232 | 0.35 | 200 |
| 16 | 4.37 | 589 | 602 | 834 | 1225 | 0.36 | 202 |
| 17 | 4.31 | 588 | 604 | 838 | 1244 | 0.35 | 199 |
| 18 | 4.25 | 599 | 606 | 858 | 1256 | 0.35 | 200 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

We claim:

1. A tempered glass body in a form suitable for use as a fire and safety glass pane, having in the tempered state the following properties:

a compressive stress of at least 80 N/mm$^2$ to about 120 N/mm$^2$, a coefficient of thermal expansion $\alpha_{20/300}$ between 3 and $6 \times 10^{-6}$ K$^{-1}$, a specific thermal stress $\phi$ between 0.3 and 0.5 n/(mm$^2 \times$ K), a glass transition temperature Tg between 535° and 850° C., a product of the specific thermal stress $\sigma$ multiplied by (Tg-20° C.) between 180° and 360N/mm$^2$, a temperature at a viscosity of $10^{13}$ dPas above 560° C., a softening temperature at a viscosity of $10^{7.6}$ dPas above 830° C., a working temperature at a viscosity of $10^4$ dPas (working temperature) below 1300° C., said glass consisting essentially of the following composition in weight percent based on oxides:

| | |
   |---|---|
   | SiO$_2$ | 73–78 |
   | B$_2$O$_3$ | 9–12 |
   | Al$_2$O$_3$ | 1.5–4 |
   | Li$_2$O | 0–4 |
   | Na$_2$O | 1–5 |
   | K$_2$O | 1–5 |
   | MgO | 0–3 |
   | CaO | 1–3 |
   | SrO + BaO | 0–2 |
   | ZnO | 1–2 |
   | ZrO$_2$ | 0.5–3 |
   | Σ alkali metal oxides | 5–7 |
   | Σ MgO + CaO + SrO + BaO + ZnO + ZrO$_2$ | 6–10. |

2. A glass body according to claim 1, in the form of a glass pane under a compressive stress of 80–120N/mm$^2$.

3. A glazing comprising a glass pane according to claim 1, mounted in a frame.

4. In a process of tempering a glass in an air tempering plant in order to produce a prestressed glass body, according to claim 1 the improvement wherein said glass, in weight percent based on oxides, consists essentially of:

| | |
   |---|---|
   | SiO$_2$ | 73–78 |
   | B$_2$O$_3$ | 9–12 |
   | Al$_2$O$_3$ | 1.5–4 |
   | Li$_2$O | 0–4 |
   | Na$_2$O | 1–5 |
   | K$_2$O | 1–5 |
   | MgO | 0–3 |
   | CaO | 1–3 |
   | SrO + BaO | 0–2 |
   | ZnO | 1–2 |
   | ZrO$_2$ | 0.5–3 |
   | Σ alkali metal oxides | 5–7 |
   | Σ MgO + CaO + SrO + BaO + ZnO + ZrO$_2$ | 6–10. |

5. A glass body according to claim 1 having a thickness of 5–7 mm.

6. A glazing according to claim 3, wherein the glass pane has a thickness of 5–7 mm.

7. A glass body according to claim 1 which will disintegrate into fine pieces in compliance with DIN 1249, part 12, in the event of mechanical breaking.

8. A glass body according to claim 3 which will disintegrate into fine pieces in compliance with DIN 1249, part 12, in the event of mechanical breaking.

9. A glass body according to claim 5 which will disintegrate into fine pieces in compliance with DIN 1249, part 12, in the event of mechanical breaking.

10. A glass body according to claim 6 which will disintegrate into fine pieces in compliance with DIN 1249, part 12, in the event of mechanical breaking.

11. A glass body according to claim 7 which will provide fire resistance for at least 30 minutes in compliance with DIN 4102, part 13.

12. A glass body according to claim 8 which will provide fire resistance for at least 30 minutes in compliance with DIN 4102, part 13.

13. A glass body according to claim 9 which will provide fire resistance for at least 30 minutes in compliance with DIN 4102 part 13.

14. A glass body according to claim 11 which will provide fire resistance for at least 30 minutes in compliance with DIN 4102, part 13.

* * * * *